US012613361B2

(12) United States Patent
Anduran et al.

(10) Patent No.: US 12,613,361 B2
(45) Date of Patent: Apr. 28, 2026

(54) LIQUID LENSES CONFIGURED FOR THERMAL EXPOSURE RESISTANCE AND METHODS OF MAKING THE SAME

(71) Applicant: CORNING INCORPORATED, Corning, NY (US)

(72) Inventors: Julie Colette Anduran, Lyons (FR); Jerome René Broutin, Bilieu (FR); Nicolas Gilbert Jose Samper, La Côte St André (FR)

(73) Assignee: CORNING INCORPORATED, Corning, NY (US)

( * ) Notice: Subject to any disclaimer, the term of this patent is extended or adjusted under 35 U.S.C. 154(b) by 727 days.

(21) Appl. No.: 17/545,421

(22) Filed: Dec. 8, 2021

(65) Prior Publication Data

US 2022/0179132 A1 Jun. 9, 2022

Related U.S. Application Data

(60) Provisional application No. 63/122,569, filed on Dec. 8, 2020.

(51) Int. Cl.
 *G02B 3/14* (2006.01)
 *G02B 26/00* (2006.01)
(52) U.S. Cl.
 CPC ............. *G02B 3/14* (2013.01); *G02B 26/005* (2013.01)
(58) Field of Classification Search
 CPC ........ G02B 3/14; G02B 26/005; G02B 7/008; G02B 7/02–028; G02B 2207/115; C03C 27/048; G02C 7/085
 See application file for complete search history.

(56) References Cited

U.S. PATENT DOCUMENTS 2,300,251 A * 10/1942 Flint ........................ G02B 3/14
 367/150
4,591,627 A * 5/1986 Maruno ................. C08G 59/38
 156/330
(Continued)

FOREIGN PATENT DOCUMENTS

CN 108873123 A 11/2018
EP 3100080 B1 * 3/2023 ............. G02C 7/085
(Continued)

OTHER PUBLICATIONS

Gih Keong Lau et al., Challenges of Using Dielectric Elastomer Actuators to Tune Liquid Lens, 2014, pp. 1-6 [online], [retrieved Jun. 25, 2024], retrieved from Internet <URL: https://www.spiedigitallibrary.org/conference-proceedings-of-spie/9056/90561J/Challenges-of-using-dielectric-elastomer-actuators>. (Year: 204).*
(Continued)

*Primary Examiner* — Ephrem Z Mebrahtu
(74) *Attorney, Agent, or Firm* — Yiqun Zhao

(57) ABSTRACT

A liquid lens device includes: first and second immiscible fluids defining an interface moveable by electrowetting; a cap portion; a base portion; a gasket positioned between the cap portion and the base portion; an upper window positioned within the cap portion; and a lower window positioned within the base portion, the windows facing and substantially parallel to each other. The lower window comprises opposing primary surfaces and an edge. The lower window is joined to the base portion with an adhesive, the adhesive positioned in contact with a portion of one or more of the primary surfaces and the edge. The fluids are sealed within the cap portion, base portion, gasket and windows. Further, a height of the edge of the lower window is greater than 0.3 mm and less than 1.2 mm.

12 Claims, 5 Drawing Sheets

(56) References Cited

U.S. PATENT DOCUMENTS

| | | | | |
|---|---|---|---|---|
| 5,223,562 | A | * | 6/1993 | Sagawa ................ C09D 127/12 |
| | | | | 524/904 |
| 5,446,591 | A | * | 8/1995 | Medlock ................... G02B 3/12 |
| | | | | 359/830 |
| 7,515,350 | B2 | | 4/2009 | Berge et al. |
| 9,048,402 | B2 | * | 6/2015 | Moon ................ C08G 59/3245 |
| 2003/0128442 | A1 | * | 7/2003 | Tanaka .................. H10F 77/407 |
| | | | | 257/E31.127 |
| 2007/0133103 | A1 | | 6/2007 | Stempel et al. |
| 2009/0028491 | A1 | * | 1/2009 | Fillion .............. H01L 23/49811 |
| | | | | 385/14 |
| 2010/0254021 | A1 | | 10/2010 | Yoshida et al. |
| 2013/0320379 | A1 | * | 12/2013 | Moon ................ C08G 59/4215 |
| | | | | 523/400 |
| 2013/0320393 | A1 | * | 12/2013 | Moon .................. H10H 20/854 |
| | | | | 525/476 |
| 2014/0168803 | A1 | * | 6/2014 | Schutz ............. B29D 11/00596 |
| | | | | 264/2.7 |
| 2015/0351168 | A1 | * | 12/2015 | Yasumoto .............. H05B 33/12 |
| | | | | 428/448 |
| 2017/0174823 | A1 | * | 6/2017 | Weippert ........... C08G 59/4021 |
| 2022/0252776 | A1 | * | 8/2022 | Stein .................... G02B 6/3624 |

FOREIGN PATENT DOCUMENTS

| | | |
|---|---|---|
| JP | 05-295343 A | 11/1993 |
| KR | 10-2010-0127496 A | 12/2010 |

OTHER PUBLICATIONS

Norio Murata, Adhesives for Optical Devices, 1998 Electronic Components and Technology Conference 1178-1185, (Year: 1998).*

Krithika S. Prabhu et al., A Survey of Technical Literature on Adhesive Applications for Optics, 6665 Proceedings of SPIE 666507-1 to 666507-11 (2007). (Year: 2007).*

Milbond Adhesive System, 2016, pp. 1-4 [online], [retrieved Jun. 28, 2024], retrieved from the Internet <URL: https://web.archive.org/web/20160818220253/https://www.optical-cement.com/cements/cements/structural.html>. (Year: 2016).*

Structural Adhesives and Epoxies, 2016, pp. 1-5 [online], [retrieved Jun. 28, 2024], retrieved from the Internet <URL: https://web.archive.org/web/20160818220253/https://www.optical-cement.com/cements/cements/structural.html>. (Year: 2016).*

Apratim Majumder et al, Creep Deformation in Elastomeric Membranes of Liquid-filled Tunable-focus Lenses, 58 Applied Optics 6446-6454 (2019). (Year: 2019).*

Allison Soult, The Dissolving Process, (2020), pp. 1-4 [online], [retrieved Jun. 27, 2024], retrieved from the Internet <URL: https://chem.libretexts.org/Courses/Brevard_College/CHE_104%3A_Principles_of_Chemistry_II/03%3A_Solutions_and_Colloids/3.03%3A_The_Dissolving_Process>. (Year: 2020).*

How to prove a cylinder's surface area is (2TTr x h) + 2TTr2, 2020, pp. 1-3 [online], [retrieved Jun. 27, 2024], retrieved from the Internet <URL: ttps://www.bbc.co.uk/bitesize/topics/zrf3cdm/articles/z3n9pbk>. (Year: 2020).*

Wei Zhang et al., Design and Fabrication Optofluidic Tunable Lens by 3D Printing, 11547 Proceedings of SPIE 115470F-1 to 115470F-1 (2020). (Year: 2020).*

Riti Gupta, How to Calculate w/v (Weight by Volume), 2020, pp. 1-18 [online], [retrieved Jun. 28, 2024], retrieved from the Internet <URL: https://sciencing.com/calculate-wv-weight-volume-5092442.html>. (Year: 2020).*

Kohesi Bond, 2020, pp. 1-6 [online], [retrieved Jun. 28, 2024], retrieved from the Internet <URL: https://web.archive.org/web/20200928093256/https://kohesidbond.com/product/kb-1372-lo/>. (Year: 2020).*

Machine English Translation of CN 108873123 A obtained from Patent Translation, filed with a copy of CN 108873123 A. (Year: 2024).*

Sina Ebnesajjad (ed.), Handbook of Adhesives and Surface Preparation 185-220 (2011). (Year: 2011).*

Rick Alexander, Understanding Adhesive Failures, 2018, pp. 1-3 [online], [retrieved Jan. 20, 2025], retrieved from the Internet <URL: https://tombrowninc.com/blog/understanding-adhesive-failures/>. (Year: 2018).*

V. F. Stroganov et al., Optical Adhesives: Analysis, Achievements, and Trends in Development, 12 Polymer Science, Series D 410-416 (2019). (Year: 2019).*

Charles R. Frihart et al., Standard Test Method ASTM D 7998-19 for the Cohesive Strength Development of Wood Adhesives, e61184 Journal of Visualized Experiments 1-6 (2020). (Year: 2020).*

Invitation to Pay Additional Fees And, Where Applicable, Protest Fee; PCT/US2021/061767; dated Feb. 22, 2022; pp. 09; International Searching Authority.

International Search Report and Written Opinion of the International Searching Authority; PCT/US2021/061767; mailed on Apr. 14, 2022, 17 pages; European Patent Office.

* cited by examiner

LIQUID LENSES CONFIGURED FOR THERMAL EXPOSURE RESISTANCE AND METHODS OF MAKING THE SAME

CROSS-REFERENCE TO RELATED APPLICATIONS

This application claims the benefit of priority under 35 U.S.C. § 119 of U.S. Provisional Application Ser. No. 63/122,569 filed on Dec. 8, 2020, the content of which is relied upon and incorporated herein by reference in its entirety.

FIELD OF THE DISCLOSURE

The disclosure relates to liquid lenses configured for thermal exposure resistance and, more particularly, to liquid lens devices with windows dimensioned and adhesives processed to maximize thermal exposure resistance, such as the exposure experienced by such liquid lens devices in various automotive and military applications.

BACKGROUND

Liquid lenses generally include two fluids disposed within a chamber. Varying an electric field applied to the fluids can vary the wettability of one of the fluids relative to walls of the chamber, which has the effect of varying the shape of a meniscus formed between the two liquids. Further, in various applications, changes to the shape of the meniscus can drive controlled changes to the focal length of the lens.

Many of these liquid lenses are autofocus lenses where a voltage application leads to a change of the focal distance. Such liquid lenses can be used in cell phones and a range of other applications, including barcode readers, surveillance and traffic cameras, along with medical applications. In general, these lenses are compact in size, robust in design and respond quickly enough to remove hand jitter artifacts. Reliability of these liquid lenses for these applications is usually good, as they generally possess a shelf life of several years within the product without experiencing failure or performance degradation.

Emerging applications for liquid lenses include automotive and military applications with demanding thermal environments. For example, some of these applications demand liquid lenses that can survive at least 1000 hours of thermal exposure at a temperature of 105° C. Conventional liquid lenses can fail under such thermal exposure requirements. In many cases, the adhesives that bond the transparent windows or substrates to the metal base of these lenses fail through constant exposure to such temperatures.

Accordingly, there is a need for liquid lens designs and devices that are configured for thermal exposure resistance. More particularly, a need exists for liquid lenses with windows dimensioned and adhesives processed to maximize thermal exposure resistance, such as the exposure experienced by such liquid lenses in various automotive and military applications.

SUMMARY OF THE DISCLOSURE

According to some aspects of the present disclosure, a liquid lens device is provided that includes: first and second immiscible fluids defining an interface moveable by electrowetting; a cap portion; a base portion; a gasket positioned between the cap portion and the base portion; an upper window positioned within the cap portion; and a lower window positioned within the base portion, the windows facing and substantially parallel to each other. The lower window comprises opposing primary surfaces and an edge. The lower window is joined to the base portion with an adhesive, the adhesive positioned in contact with a portion of one or more of the primary surfaces and the edge. The fluids are sealed within the cap portion, base portion, gasket and windows. Further, a height of the edge of the lower window is greater than 0.3 mm and less than 1.2 mm.

According to other aspects of the present disclosure, a liquid lens device is provided that includes: first and second immiscible fluids defining an interface moveable by electrowetting; a cap portion; a base portion; a gasket positioned between the cap portion and the base portion; an upper window positioned within the cap portion; and a lower window positioned within the base portion, the windows facing and substantially parallel to each other. The lower window comprises opposing primary surfaces and an edge. The lower window is joined to the base portion with an adhesive, the adhesive positioned in contact with a portion of one or more of the primary surfaces and the edge. The fluids are sealed within the cap portion, base portion, gasket and windows. Further, the adhesive is a thermoset polymer comprising a hardener and a polymer at a ratio from about 0.4:10 to about 0.9:10 of the hardener to the polymer.

According to further aspects of the present disclosure, a liquid lens device is provided that includes: first and second immiscible fluids defining an interface moveable by electrowetting; a cap portion; a base portion; a gasket positioned between the cap portion and the base portion; an upper window positioned within the cap portion; and a lower window positioned within the base portion, the windows facing and substantially parallel to each other. The lower window comprises opposing primary surfaces and an edge. The lower window is joined to the base portion with an adhesive, the adhesive positioned in contact with a portion of one or more of the primary surfaces and the edge. The fluids are sealed within the cap portion, base portion, gasket and windows. Further, the adhesive is a thermoset polymer comprising a hardener and a polymer at a ratio from about 0.4:10 to about 0.9:10 of the hardener to the polymer. In addition, a height of the edge of the lower window is greater than 0.3 mm and less than 1.2 mm.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
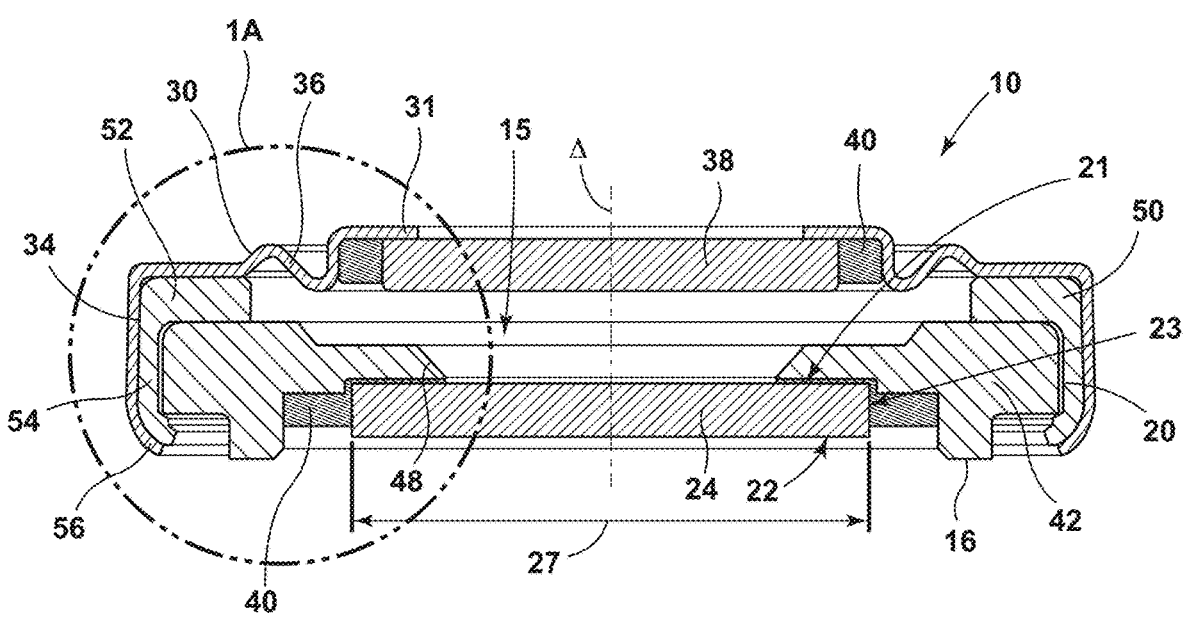
FIG. 1 is a schematic, cross-sectional view of a liquid lens, according to an embodiment of the disclosure.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "thermal exposure testing" refers to an application-oriented test of a liquid lens device in which the liquid lens device is subjected to a substantially constant temperature, e.g., 105° C., for a specified period (e.g., 1000 hours, 2000 hours, or even longer) and experiences failure rates less than a prescribed limit (e.g., zero failures, less than 5%, etc.). Typically, thermal exposure-induced failures during such testing are manifested in a failure of the bond of the adhesive to one or more of one of the windows and one or more of the cap or base portions of the lens.

In various embodiments of the disclosure, a liquid lens device is provided that includes first and second immiscible fluids that define an interface which is moveable by electrowetting, a cap portion, a base portion, a lower window within the base portion, an upper window within the cap portion, and a gasket positioned between the cap and base portions, among other features. Further, the lower window is joined to the base portion with an adhesive, and the fluids are sealed within the cap portion, base portion, gasket and windows. In addition, the height of the edge of the lower window can be configured to be greater than 0.3 mm and less than 1.2 mm. In some cases, the height of the edge of the lower window can be significantly higher, e.g., from greater than 0.3 mm to about 5 mm (or even 10 mm). Further, in some embodiments, the adhesive can be a thermoset polymer that includes a hardener and a polymer. The thermoset polymer can be set at a ratio from about 0.4:10 to about 0.9:1 of the hardener to the polymer.

The liquid lens devices detailed in this disclosure can enable, or otherwise positively influence, the achievement of various technical requirements and performance aspects of devices employing the implementations of these liquid lenses. The liquid lens devices of the disclosure can provide one or more of the following benefits or advantages. For example, the liquid lens devices of the disclosure are configured such that their respective adhesives and lower windows (and/or upper windows) are subjected to lower stress levels, which can improve long-term reliability of these devices. In particular, the stress levels associated with thermal expansion of the fluids as the liquid lens is subjected to thermal exposure from its application-related environment are reduced through the design considerations of these devices, e.g., the height of the edge of the lower window and/or the hardener-to-polymer ratio employed in the adhesive. Further, as the reliability of these liquid lens devices is improved, particularly in terms of thermal exposure, these devices can be employed in more demanding applications, such as automotive and military applications which typically subject the liquid lens devices to more severe thermal environments. As another example, the liquid lens devices of the disclosure provide additional open loop stability. That is, the liquid lens devices of the disclosure are insensitive to temperature variations, which can negatively affect the optical performance of conventional liquid lenses through thermal expansion of their immiscible fluids and the resultant bending of their transparent windows.

Figure 1A:
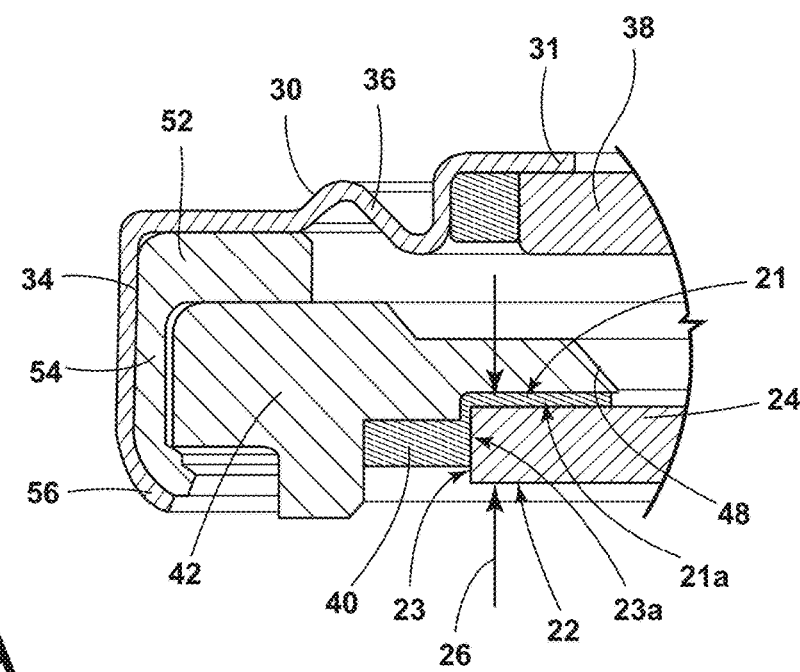
FIG. 1A is an enlarged view of a portion of the liquid lens depicted in FIG. 1.

Referring to FIGS. 1 and 1A, a liquid lens device 10 is provided that can be configured with a variable focal length. The liquid lens device 10 includes first and second immiscible fluids (not depicted in FIGS. 1 and 1A) that define an interface which is moveable by electrowetting. The device 10 also includes: a cap portion 30; a base portion 16; and a gasket 50 positioned between the cap portion 30 and the base portion 16. Further, the device 10 includes: an upper window 38 positioned within the cap portion 30; and a lower window 24 positioned within the base portion 16, the windows 24, 38 facing and substantially parallel to each other. The lower window 24 comprises opposing primary surfaces 21, 22 and an edge 23. As shown in FIGS. 1 and 1A, the lower window 24 is joined to the base portion 16 with an adhesive 40, the adhesive positioned in contact with both of portions 21a, 23a of the respective primary surface 21 and the edge 23. In some embodiments of the liquid lens device 10, the adhesive 40 is in contact with one or more of the portions 21a, 23a and a portion of the primary surface 22 (not shown in FIGS. 1 and 1A). The fluids are sealed within the cap portion 30, base portion 16, gasket 50 and windows 24, 38. In some implementations, the lower window 24 is configured with a diameter 27 of at least 4 mm, 5 mm, 7.5 mm, or up to about 10 mm.

Referring again to FIGS. 1 and 1A, the liquid lens device 10 includes an upper part and a lower part which are produced separately from one another and which, when assembled, define an internal volume 15 containing first and second immiscible fluids (not depicted in FIGS. 1 and 1A). The terms "upper" and "lower" are with reference to the drawings only, inasmuch as the liquid lens device 10 can take any orientation during use. A cylindrical member, such as a lower window 24 made of a transparent material, for example, a glass, covers an opening by being interposed between the internal volume 15 of the device 10 and the opening, and is fixed to a base portion 16 by an adhesive 40.

The upper part of the liquid lens device 10 comprises a cap portion 30, through the central part of which there passes a cylindrical opening and which is extended by a first cylindrical side wall 34, the diameter of which is greater than the diameter of a second cylindrical side wall 20 of the base portion 16. According to some embodiments of the liquid lens device 10, the diameter of the cylindrical side wall 34 can range from about 5 mm to about 200 mm, from about 10 mm to about 200 mm, from about 10 mm to about 150 mm, from about 10 mm to about 100 mm, and all ranges of diameter values within the foregoing ranges. The cap portion 30 comprises an elastic portion 36 provided between the opening and the cylindrical side wall 34. Further, the elastic portion 36 can consist of a wavy portion that exhibits symmetry of revolution about the axis Δ and of which the cross section on a plane containing the axis Δ has the shape (approximately) of an "S".

Referring to FIGS. 1 and 1A, the upper window 38, made of a transparent material, for example, a glass, covers the opening, by being interposed between the opening and the internal volume 15 of the device 10, and is fixed to the cap portion 30 by adhesive 40. In embodiments, the upper window 38 is affixed to the cap portion by positioning the adhesive 40 in contact with one or more portions of the primary surfaces and outer edge of the upper window 38 (not shown in FIGS. 1 and 1A). Advantageously, the cap portion 30 comprises an upper wall 31 connected to the upper window 38 and the cylindrical side wall 34, and the upper wall 31 includes the elastic portion 36 with symmetry of revolution about the optical axis (Δ) of the liquid lens device 10. For example, the cap portion 30 can be made of a metal material, e.g., stainless steel, brass, etc., as formed through stamping, machining, etc. The thickness of the upper wall 31 of the cap portion 30 will depend on the expected variations of volume to compensate for the effects of expansion of the first and second immiscible fluids. For example, a typical thickness of the upper wall 31 from about 0.05 mm to 0.25 mm has shown good results for liquid lens devices whose outer diameter is below about 20 mm.

As shown in FIGS. 1 and 1A, the liquid lens device 10 comprises lower and upper windows 24, 38 that face each other and are parallel to one another. The two windows 24, 38 delimit, at least in part, an internal volume 15 containing the first and second immiscible fluids, with different optical indices, defining an interface (not shown in detail in FIGS. 1 and 1A). As shown, the windows 24, 38 are plates made from an optically transparent material, e.g., an amorphous material (e.g., a glass or a polymer), a semi-crystalline material (e.g., a glass-ceramic) or a crystalline material (e.g., a sapphire or a quartz). According to a variant, at least one of the windows 24, 38 can be a lens of fixed optical length, centered on the optical axis (Δ) of the variable focus lens.

As also shown in FIGS. 1 and 1A, the liquid lens device 10 comprises a cap portion 30 connected to upper window 38, which comprises a first cylindrical side wall 34. The device also comprises the base portion 16, preferably having a symmetry of revolution, with the axis of revolution defining the optical axis (Δ) of the lens. The base portion 16 is connected to the lower window 24 and comprises a second cylindrical side wall 20 of a diameter smaller than the diameter of the first cylindrical side wall 34. Further, the upper electrode of the liquid lens device 10 comprises the cap portion 30, and the lower electrode of the device 10 comprises the base portion 16. The gasket 50 is provided to ensure the tightness of the components of the liquid lens device 10. In implementations of the device 10, the gasket 50 is compressed between the first and second cylindrical side walls 34, 20. In the embodiment shown in FIGS. 1 and 1A, the gasket 50 comprises skirt portion 54 compressed between the first and second cylindrical side walls 34, 20, and a portion 52 compressed between the cap portion 30 and an intermediate part 42, forming, in this example, a single piece with the base portion 16, and comprising an opening defining a conical or cylindrical surface 48 where the interface between the first and second immiscible fluids is able to move.

According to the embodiment of the liquid lens device 10 shown in FIGS. 1 and 1A, the lens device 10 further includes the elastic portion 36, which is capable of deforming in response to a change in pressure of the first and second fluids. In this embodiment, elastic portion 36 is formed on an upper wall 31 of the cap portion 30 in a bent configuration, where the non-linear portions have symmetry of revolution about the optical axis (Δ) of the lens. For example, the bent aspect of the elastic portion 36 comprises at least one arcuate, preferably circular, bend centered on the optical axis (Δ) of the lens. In this example also, the cap portion 30 can preferably be made of a stamped metal, e.g., stainless steel. The thickness of the upper wall 31 of the cap portion 30 will depend on the expected variations of volume, in order to compensate for the effects of expansion of the immiscible fluids. For example, a typical thickness of the upper wall 31 from about 0.05 mm to 0.25 mm has shown good results for lenses whose outer diameter is below about 20 mm.

Referring again to the liquid lens device 10 shown in FIGS. 1 and 1A, the first cylindrical side wall 34 comprises a rim 56 crimped onto the base portion 16 for the sealing of the cap portion 30 onto the base portion 16. Other methods for sealing the cap portion 30 onto the base portion 16 are also possible; for example, the cap portion 30 can be glued onto the base portion 16.

In some embodiments of the liquid lens device 10 depicted in FIGS. 1 and 1A, the height 26 of the edge 23 of the lower window 24 is greater than 0.3 mm and less than 1.2 mm. According to some embodiments of the liquid lens device 10, the height 26 of the lower window 24 can range from greater than 0.3 mm to less than 1.2 mm, or from greater than 0.3 mm to less than or equal to about 1.15 mm, 1.1 mm, 1.05 mm, 1.0 mm, 0.95 mm, 0.9 mm, 0.85 mm, 0.8 mm, 0.75 mm, 0.7 mm, 0.65 mm, 0.6 mm, 0.55 mm, 0.5 mm, 0.45 mm, and all ranges and sub-ranges of the height 26 between the preceding values. For example, the height 26 of the edge 23 of the lower window 24 can be 0.32 mm, 0.33 mm, 0.34 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, 1.05 mm, 1.1 mm, 1.15 mm, and other height values between these values. Further, according to some implementations of the liquid lens device 10, the height 26 of the lower window can span from greater than 0.3 mm to 10 mm, from greater than 0.3 mm to 7.5 mm, from 0.3 mm to 5 mm, and all ranges and sub-ranges of the height 26 between the preceding values. In addition, embodiments of the liquid lens device 10 depicted in FIGS. 1 and 1A can also realize the benefits and advantages of the disclosure by controlling the height of the upper window 38 in a manner consistent with the foregoing values of the height 26 of the lower window 24.

According to another embodiment of the liquid lens device 10 shown in FIGS. 1 and 1A, the adhesive 40 can be configured as a thermoset polymer (e.g., an epoxy), a methacrylate-based adhesive, a polyurethane-based adhesive, a silicon-based adhesive, and/or an acrylic-based adhesive. In such embodiments employing a thermoset polymer for the adhesive 40, the thermoset polymer can include one or more hardener and polymer constituents. The hardener and polymer constituents of the adhesive 40 (as a thermoset polymer) can be configured according to a ratio from greater than about 0.4:10 to less than about 1:10 of the hardener to the polymer. In some embodiments of the liquid lens device 10, the hardener and polymer constituents of the adhesive 40 can be configured according to a ratio from greater than about 0.4:10 to about 0.95:10, to about 0.9:10, to about 0.85:10, to about 0.8:10, to about 0.75:10, to about 0.7:10, to about 0.65:10, to about 0.6:10; from about 0.5:10 to about 0.7:10, and all ratios between the preceding ranges of ratios. For example, the hardener and polymer constituents of the adhesive 40 can be configured according to a ratio of 0.45:10, 0.5:10, 0.55:10, 0.6:10, 0.65:10, 0.7:10, 0.75:10, 0.8:10, 0.85:10, 0.9:10, 0.95:10, and all ratios between the foregoing ratios.

According to embodiments of the liquid lens device 10 depicted in FIGS. 1 and 1A, the device can be characterized by zero defects (or a failure rate of less than 5% or less than 10%, for some embodiments) upon thermal exposure testing at 105° C. for 500 hours, 750 hours, 1000 hours, 1500 hours, 2000 hours, or even longer. In some implementations, the liquid lens device 10 is configured such that it experiences zero defects (or low failure rates less than 10%) upon being subjected to thermal exposure testing at 105° C. for at least 500 hours, 600 hours, 700 hours, 800 hours, 900 hours, 1000 hours, 1250 hours, 1500 hours, 1750 hours, 2000 hours, and other exposures above or between these durations. For example, the liquid lens device 10 can be configured such that it experiences zero defects (or failures rates of less than 10%) upon being subjected to thermal exposure testing at 105° C. for 500 hours, 550 hours, 600 hours, 650 hours, 700 hours, 750 hours, 800 hours, 850 hours, 900 hours, 950 hours, 1000 hours, 1100 hours, 1200 hours, 1300 hours, 1400 hours, 1500 hours, 1600 hours, 1700 hours, 1800 hours, 1900 hours, 2000 hours, and all values between these durations.

According to some implementations of the liquid lens device 10 depicted in FIGS. 1 and 1A, the portion 21a of the primary surface 21 of the lower window 24 can be configured with a surface area of at least 7.0 mm², e.g., to provide an optimal surface area to join the lower window 24 to the base portion 16 with the adhesive 40 while minimizing stress in the adhesive 40 associated with thermal expansion of the first and second immiscible fluids. In some implementations, the surface area of the portion 21a of the primary surface 21 of the lower window 24 can be at least 7.0 mm², 7.5 mm², 8.0 mm², 8.5 mm², 9.0 mm², 9.5 mm², 10.0 mm², and greater than all surface area values above the preceding lower limits. Similarly, the surface area of the portion 23a of the edge 23 of the lower window 24 can be configured with a surface area of at least 2.0 mm², e.g., to provide an optimal surface area to join the lower window 24 to the base portion 16 with the adhesive 40 while minimizing stress in the adhesive 40 associated with thermal expansion of the first and second immiscible fluids. In some implementations, the surface area of the portion 23a of the edge 23 of the lower window 24 can be at least 2.0 mm², 2.5 mm², 3.0 mm², 3.5 mm², 4.0 mm², 4.5 mm², 5.0 mm², and greater than all surface area values above the preceding lower limits. In addition, according to some embodiments, the portion 23a of the edge 23 of the lower window 24 can be configured with a height of at least 0.15 mm, at least 0.25 mm, or at least 0.5 mm. In some embodiments, for example, the portion 23a of the edge 23 of the lower window 24 can be configured with a height of 0.15 mm, 0.2 mm, 0.25 mm, 0.3 mm, 0.35 mm, 0.4 mm, 0.45 mm, 0.5 mm, and all height values between these levels.

Figure 2B:
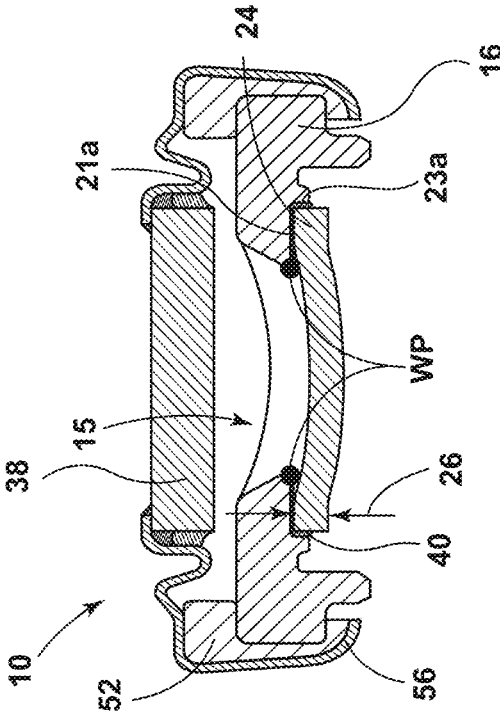
FIGS. 2A and 2B are schematic, cross-sectional views of a liquid lens as experiencing thermal expansion of its fluids, according to an embodiment of the disclosure.
Figure 2A:
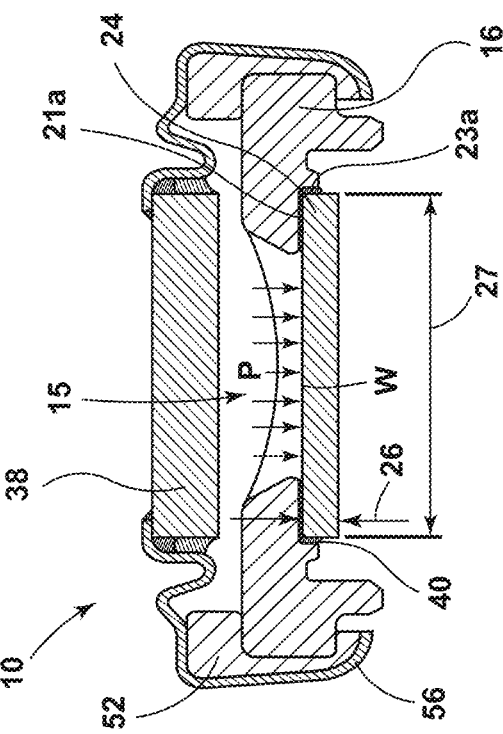

Referring now to FIGS. 2A and 2B, schematic, cross-sectional views of a liquid lens device 10 are provided. The liquid lens devices 10 of the disclosure are configured for long-term reliability as subjected to thermal exposure testing. As shown in these figures, the pressure of the immiscible fluids in the device 10 should exceed atmospheric pressure, and is typically set at about 2 bar through a crimping and pressurization process. This ensures that air bubbles do not appear within the fluids, as such a situation could occur if the pressure inside the device was lower than atmospheric pressure. However, an increase in temperature can cause thermal expansion of the immiscible fluids, which can further increase the pressure, "P", as shown in FIG. 2A. As the pressure, P, is increased through thermal expansion of the immiscible fluids, the lower window 24 can bend as shown in FIG. 2B. This bending has two consequences. First, the optical power of the liquid lens device 10 can be negatively influenced by the change in shape of the lower window 24. Second, the bending of the lower window 24 can result in high stress at points of the adhesive 40 between the lower window 24 and the base portion 16, denoted "WP". The high stress levels at point WP can lead to de-bonding and/or delamination of the adhesive 40 from the window 24 and/or base portion 16. Nevertheless, the liquid lens devices 10 of the disclosure minimize or eliminate these effects by increasing the overall stiffness of the system (e.g., through increasing the height 26 of the lower window 24 and/or by adjusting the mechanical properties of the adhesive 40 through control of hardener-to-polymer ratios).

EXAMPLES

Various embodiments will be further clarified by the following examples, which are exemplary of the articles of the disclosure.

Example 1

Figures 3A, 3B, 3C, 3D:
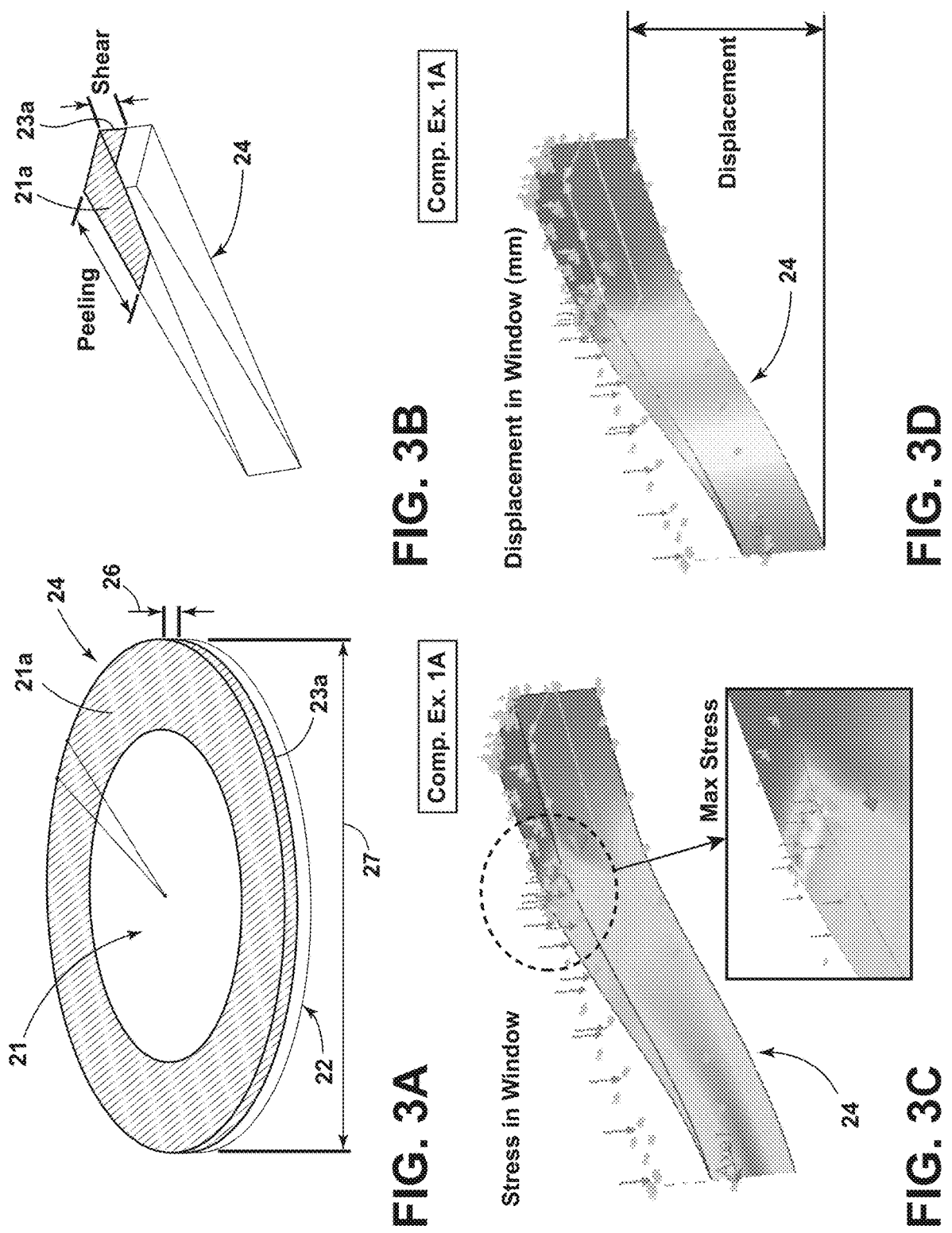
FIGS. 3A-3D are schematic, perspective views of a lower window of a liquid lens, as subjected to an as-modeled stress originating from the thermal expansion of its fluids, according to an embodiment of the disclosure.

In this example, the adhesive joint of the lower window and base portion was modeled using finite element analysis (FEA) techniques that are commonly employed by those of ordinary skill of the disclosure. Referring now to FIGS. 3A and 3B, schematic, perspective views of a lower window of a liquid lens are depicted (e.g., the lower window 24 of the liquid lens device 10 depicted in FIGS. 1 and 1A), as subjected to an as-modeled stress originating from the thermal expansion of the immiscible fluids of the liquid lens Additional modeling was performed on conventional liquid lens devices and liquid lens devices consistent with the principles of the disclosure. In particular, each of the diameter 27, height 26, portion 23a of the edge 23, and portion 21a of the primary surface 21 of the lower window 24 was varied as listed below in Table 1 for the samples of this example (denoted as "Comp. Exs. 1A-1C" and "Exs. 1A-1D"). As is evident from the data of Table 1, the maximum stress level is relatively insensitive to changes in the outer diameter of the lower window, height and surface area of the portion of the edge of the window with adhesive, and surface area of the portion of the primary surface of the window. Further, those samples with lower windows having a height of about 0.3 mm, Comp. Exs. 1A-1C, exhibited relatively high maximum stress levels and maximum displacement levels. In contrast, those samples with lower windows having a height of about 0.55 mm, Exs. 1A-1D, exhibited relatively low maximum stress levels and displacement levels, about a factor of two lower than the respective values of the control group, Comp. Exs. 1A-1C.

TABLE 1

| Sample ID | Outer Diameter of Window (mm) | Height of Window Edge (mm) | Height of Portion of Window Edge with Adhesive (mm) | Surface Area of Portion of Window Primary Surface with Adhesive (mm²) | Surface Area of Portion of Window Edge with Adhesive (mm²) | Maximum Stress Level in Window (N/mm²) | Maximum Displacement of Window (mm) |
|---|---|---|---|---|---|---|---|
| Comp. Ex. 1A | 4.15 | 0.3 | 0.15 | 7.4 | 2 | 372.9 | 4.479E−9 |
| Comp. Ex. 1B | 4.45 | 0.3 | 0.15 | 9.4 | 2.1 | 331.4 | 4.475E−9 |
| Comp. Ex. 1C | 4.45 | 0.3 | 0.25 | 9.4 | 3.5 | 328.1 | 4.480E−9 |
| Ex. 1A | 4.15 | 0.55 | 0.15 | 7.4 | 2 | 201.1 | 9.446E−10 |
| Ex. 1B | 4.45 | 0.55 | 0.15 | 9.4 | 2.1 | 170.3 | 9.359E−10 |
| Ex. 1C | 4.45 | 0.55 | 0.25 | 9.4 | 3.5 | 168.4 | 9.534E−10 |
| Ex. 1D | 4.45 | 0.55 | 0.5 | 9.4 | 7 | 166 | 9.807E−10 | device employing the window. As shown in FIGS. 3A and 3B, each of the diameter 27, height 26, portion 23a of the edge 23, and portion 21a of the primary surface 21 of the lower window 24 was varied in the modeling of this example. Further, a constant pressure (denoted as "P") of 10 N/mm² was applied to each of the windows 24 of the liquid lens devices of this example to simulate the stresses associated with thermal expansion of the fluids of these devices, as shown by the arrows depicted in FIGS. 3A and 3B.

With regard to FIGS. 3C and 3D, FEA results of the modeling of a window of a comparative liquid lens device (denoted "Comp. Ex. 1A") are depicted. For this sample, the height 26 of the window 24 was set at 0.3 mm; the diameter 27 of the window 24 was set at 4.15 mm; the portion 21a of the primary surface 21 was set at a surface area of 7.4 mm²; and the portion 23a of the edge 23 of the window 24 was set at a surface area of 2.0 mm². As shown in FIG. 3C, the maximum stress level observed in the window 24, about 372.9 N/m², is at a location between the center of the window 24 and its edge 23, and closer proximity to the edge 23. As shown in FIG. 3D, the applied pressure results in a maximum displacement in the center of the window 24. Further, in the case of this sample (Comp. Ex. 1A), the downward displacement of the lower window 24 was estimated to be 4.5×10⁻⁹ mm. Without being bound by theory, such a displacement, caused by thermal exposure of the device, can be manifested in a bending of the window 24 that compromises its optical performance and/or leads to a premature failure of the adhesive joint between the lower window and a base portion.

Figure 3E:
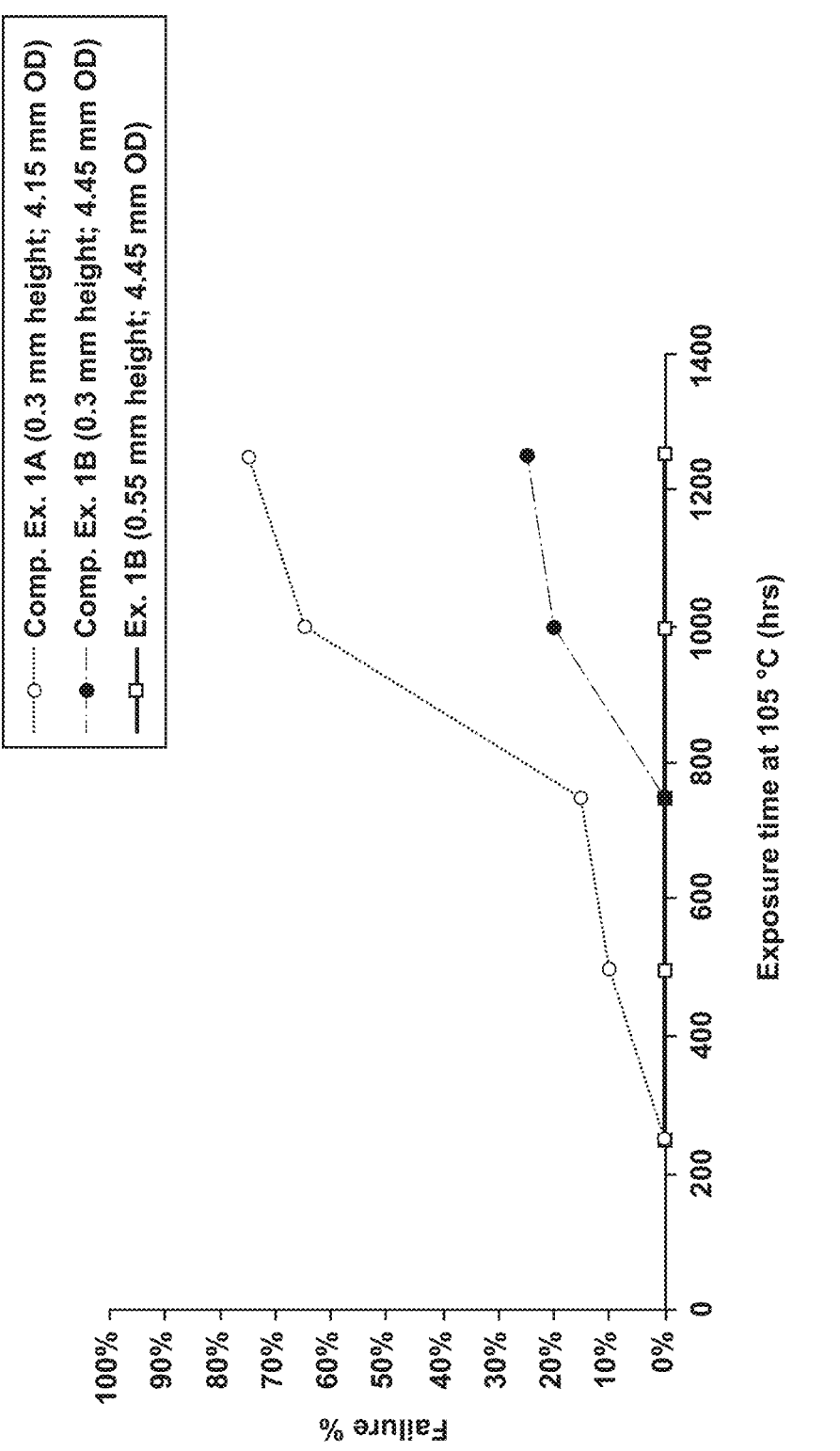
FIG. 3E is a plot of failure percentage as a function of thermal exposure time at 105° C. of comparative and inventive liquid lenses employing different lower window heights, according to an embodiment of the disclosure.

Referring now to FIG. 3E, a plot is provided of failure percentage as a function of thermal exposure time at 105° C. of comparative and inventive liquid lenses (i.e., Comp. Ex. 1A, Comp. Ex. 1B and Ex. 1B) employing different lower window heights. As is evident from FIG. 3E, the thermal exposure testing results are consistent with the modeling results in Table 1. In particular, the comparative liquid lenses with the lower windows having a smaller height (0.3 mm) perform significantly worse than the inventive liquid lenses with the lower windows having a larger height (0.55 mm). Further, while not shown in FIG. 3E and Table 1, additional thermal exposure testing on liquid lenses with windows configured as in Exs. 1A-1D, but with lower window heights of 0.7 mm and 0.9 mm, demonstrates that these lenses with lower windows with larger heights have experienced no failures to date through testing up to and including 1250 hours at 105° C.

Example 2

Figure 4:
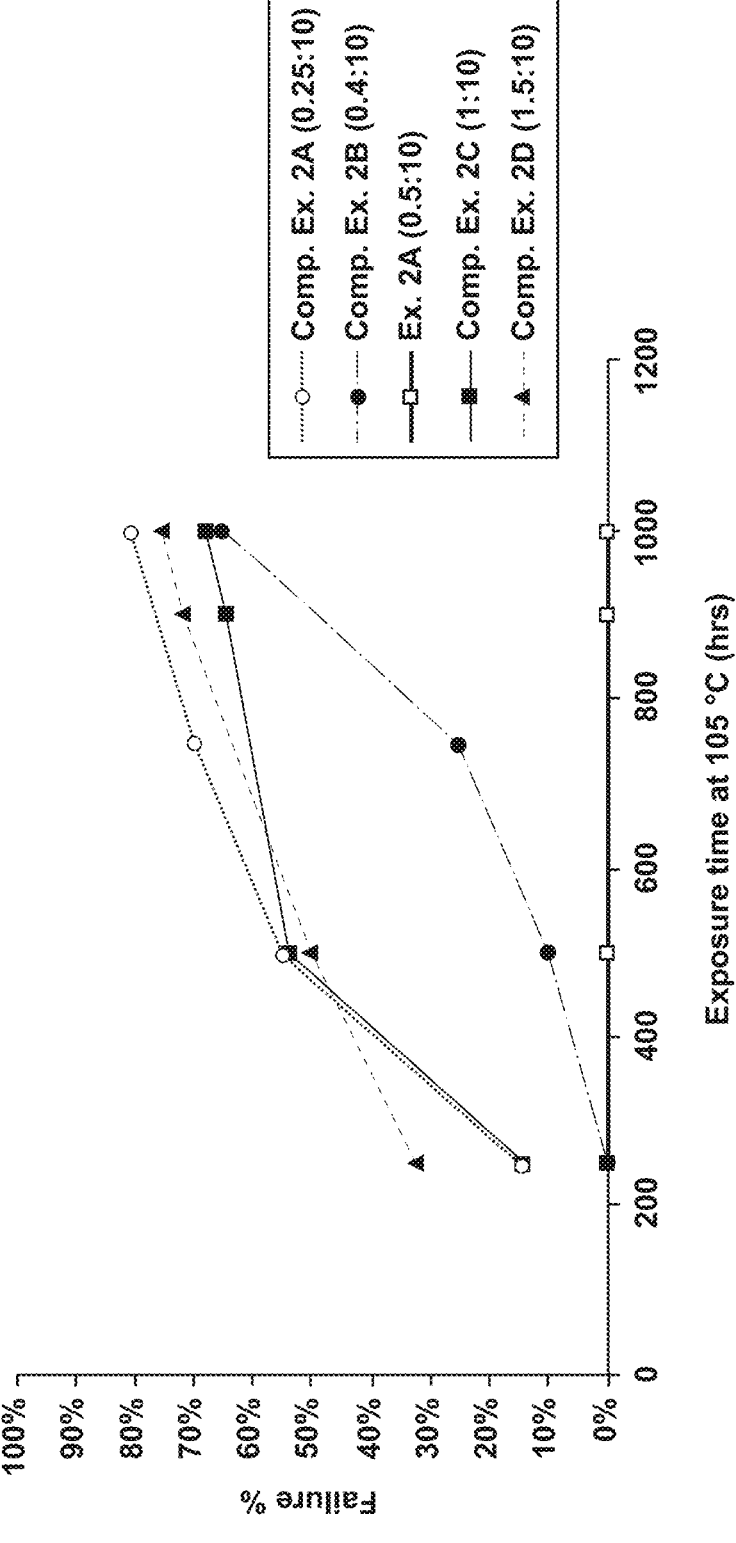
FIG. 4 is a plot of failure percentage as a function of thermal exposure time at 105° C. of liquid lenses employing comparative adhesive formulations and an adhesive formulation, according to an embodiment of the disclosure.

According to this example, a set of conventional liquid lens device samples and one liquid lens device according to principles of the disclosure were prepared. In particular, all of the liquid lens devices of this example were prepared such that each of the following features had the same dimensions: diameter of the lower window, height of the lower window, portion of the edge of the window with adhesive, and portion of the primary surface of the lower window with adhesive. The adhesive employed in these samples was a thermoset polymer which was varied in terms of its composition and microstructure. In particular, comparative liquid lens device samples were prepared with thermoset polymer adhesives having the following ratios of hardener to polymer: 0.25:10, 0.4:10, 1:10, and 1.5:10. These samples are denoted as follows in FIG. 4: "Comp. Ex. 2A (0.25:10)"; "Comp. Ex. 2B (0.4:10)"; "Comp. Ex. 2C (1:10)"; and "Comp. Ex. 2D (1.5:10)". Further, a liquid lens device sample was prepared according to principles of the disclosure with a thermoset adhesive having a ratio of hardener to polymer of 0.5:10 and denoted as "Ex. 2A (0.5:10)". Each of the samples of this example were then subjected to thermal exposure testing at 105° C. for 200 to 1000 hours.

Referring again to FIG. 4, a plot is provided of the failure percentage as a function of thermal exposure time at 105° C. (i.e., from 200 to 1000 hours) of the liquid lens devices of this example. As is evident from FIG. 4, only the liquid lens device prepared with an adhesive formulated according to the principles of the disclosure, Ex. 2A, exhibited zero defects at durations of 200, 400, 600, 800 and 1000 hours of thermal exposure at 105° C. Without being bound by theory, it is believed that optimizing the amount of hardener in the adhesive relative to the amount of polymer plays a significant role in the final mechanical properties of the adhesive. More particularly, it is believed that employing a thermoset polymer formulated with a ratio of hardener to polymer from about 04:10 to about 0.9:10 provides an adhesive with optimal properties for use in liquid lens devices with high reliability as characterized by no defects in thermal exposure testing at 105° C. for 750 hours, or more.

Variations and modifications may be made to the above-described embodiments of the disclosure without departing substantially from the spirit and various principles of the disclosure. All such modifications and variations are intended to be included herein within the scope of this disclosure and protected by the following claims. For example, the various features of the disclosure may be combined according to the following embodiments.

Embodiment 1. According to a first embodiment, a liquid lens device is provided. The liquid lens device comprises: first and second immiscible fluids defining an interface moveable by electrowetting; a cap portion; a base portion; a gasket positioned between the cap portion and the base portion; an upper window positioned within the cap portion; and a lower window positioned within the base portion, the windows facing and substantially parallel to each other. The lower window comprises opposing primary surfaces and an edge. The lower window is joined to the base portion with an adhesive, the adhesive positioned in contact with a portion of one or more of the primary surfaces and the edge. The fluids are sealed within the cap portion, base portion, gasket and windows. A height of the edge of the lower window is greater than 0.3 mm and less than 1.2 mm.

Embodiment 2. According to a second embodiment, the first embodiment is provided, wherein the device is characterized by zero defects upon thermal exposure testing at 105° C. for 750 hours.

Embodiment 3. According to a third embodiment, the first embodiment is provided, wherein the device is characterized by zero defects upon thermal exposure testing at 105° C. for 1000 hours.

Embodiment 4. According to a fourth embodiment, any one of the first through third embodiments is provided, wherein the portion of one or more of the primary surfaces and the edge of the lower window comprises a surface area of at least 7.0 mm² and 2.0 mm², respectively.

Embodiment 5. According to a fifth embodiment, any one of the first through fourth embodiments is provided, wherein a diameter of the lower window is at least 4 mm.

Embodiment 6. According to a sixth embodiment, any one of the first through fifth embodiments is provided, wherein the height of the edge of the lower window is greater than 0.3 mm and less than or equal to 0.6 mm.

Embodiment 7. According to a seventh embodiment, any one of the first through sixth embodiments is provided, wherein the portion of the edge of the lower window comprises a height of at least 0.15 mm.

Embodiment 8. According to an eighth embodiment, a liquid lens device is provided. The liquid lens device comprises: first and second immiscible fluids defining an interface moveable by electrowetting; a cap portion; a base portion; a gasket positioned between the cap portion and the base portion; an upper window positioned within the cap portion; and a lower window positioned within the base portion, the windows facing and substantially parallel to each other. The lower window comprises opposing primary surfaces and an edge. The lower window is joined to the base portion with an adhesive, the adhesive positioned in contact with a portion of one or more of the primary surfaces and the edge. The fluids are sealed within the cap portion, base portion, gasket and windows. The adhesive is a thermoset polymer comprising a hardener and a polymer at a ratio from about 0.4:10 to about 0.9:10 of the hardener to the polymer.

Embodiment 9. According to a ninth embodiment, the eighth embodiment is provided, wherein the device is characterized by zero defects upon thermal exposure testing at 105° C. for 750 hours.

Embodiment 10. According to a tenth embodiment, the eighth embodiment is provided, wherein the device is characterized by zero defects upon thermal exposure testing at 105° C. for 1000 hours.

Embodiment 11. According to an eleventh embodiment, any one of the eighth through tenth embodiments is provided, wherein the ratio is from about 0.5:10 to about 0.7:10 of the hardener to the polymer.

Embodiment 12. According to a twelfth embodiment, any one of the eighth through eleventh embodiments is provided, wherein a diameter of the lower window is at least 4 mm.

Embodiment 13. According to a thirteenth embodiment, a liquid lens device is provided. The liquid lens device comprises: first and second immiscible fluids defining an interface moveable by electrowetting; a cap portion; a base portion; a gasket positioned between the cap portion and the base portion; an upper window positioned within the cap portion; and a lower window positioned within the base portion, the windows facing and substantially parallel to each other. The lower window comprises opposing primary surfaces and an edge. The lower window is joined to the base portion with an adhesive, the adhesive positioned in contact with a portion of one or more of the primary surfaces and the edge. The fluids are sealed within the cap portion, base portion, gasket and windows. The adhesive is a thermoset polymer comprising a hardener and a polymer at a ratio from about 0.4:10 to about 0.9:10 of the hardener to the polymer. A height of the edge of the lower window is greater than 0.3 mm and less than 1.2 mm.

Embodiment 14. According to a fourteenth embodiment, the thirteenth embodiment is provided, wherein the device is characterized by zero defects upon thermal exposure testing at 105° C. for 750 hours.

Embodiment 15. According to a fifteenth embodiment, the thirteenth embodiment is provided, wherein the device is characterized by zero defects upon thermal exposure testing at 105° C. for 1000 hours.

Embodiment 16. According to a sixteenth embodiment, any one of the thirteenth through fifteenth embodiments is provided, wherein the portion of one or more of the primary surfaces and the edge of the lower window comprises a surface area of at least 7.0 mm$^2$ and 2.0 mm$^2$, respectively.

Embodiment 17. According to a seventeenth embodiment, any one of the thirteenth through sixteenth embodiments is provided, wherein a diameter of the lower window is at least 4 mm.

Embodiment 18. According to an eighteenth embodiment, any one of the thirteenth through seventeenth embodiments is provided, wherein the height of the edge of the lower window is greater than 0.3 mm and less than or equal to 0.6 mm.

Embodiment 19. According to a nineteenth embodiment, any one of the thirteenth through eighteenth embodiments is provided, wherein the portion of the edge of the lower window comprises a height of at least 0.15 mm.

Embodiment 20. According to a twentieth embodiment, any one of the thirteenth through nineteenth embodiments is provided, wherein the ratio is from about 0.5:10 to about 0.7:10 of the hardener to the polymer.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A liquid lens device, comprising:
first and second immiscible fluids defining an interface moveable by electrowetting;
a cap portion;
a base portion;
a gasket positioned between the cap portion and the base portion;
an upper window comprising a glass, glass-ceramic or crystalline material positioned within the cap portion, wherein the upper window comprises first opposing primary surfaces and a first edge; and
a lower window positioned within the base portion, the windows facing and substantially parallel to each other, wherein the lower window comprises second opposing primary surfaces and a second edge, wherein the lower window is joined to the base portion with an adhesive, the adhesive positioned in contact with a portion of one or more of the second opposing primary surfaces and in contact with the second edge,
wherein the fluids are sealed within the cap portion, base portion, gasket and windows, and
further wherein a height of the first edge of the upper window and the second edge of the lower window are greater than 0.50 mm and less than 1.2 mm.

2. The device according to claim 1, wherein the portion of one or more of the primary surfaces, and the edge of the lower window, comprises a surface area of at least 7.0 mm$^2$ at least 2.0 mm$^2$, respectively.

3. The device according to claim 1, wherein a diameter of the lower window is at least 4 mm.

4. The device according to claim 1, wherein the height of the edge of the lower window is greater than 0.5 mm and less than or equal to 0.6 mm.

5. The device according to claim 1, wherein the portion of the edge of the lower window comprises a height of at least 0.15 mm.

6. A liquid lens device, comprising:
first and second immiscible fluids defining an interface moveable by electrowetting;
a cap portion;
a base portion;
a gasket positioned between the cap portion and the base portion;
an upper window comprising a glass, glass-ceramic or crystalline material positioned within the cap portion; and
a lower window positioned within the base portion, the windows facing and substantially parallel to each other, wherein the lower window comprises opposing primary surfaces and an edge, the edge including a height of greater than 0.50 mm and less than 1.2 mm, wherein the lower window is joined to the base portion with an adhesive, the adhesive positioned in contact with a portion of one or more of the primary surfaces and in contact with the edge,
wherein the fluids are sealed within the cap portion, base portion, gasket and windows, and
further wherein the adhesive is a thermoset polymer comprising a hardener and a polymer.

7. The device according to claim 6, wherein a diameter of the lower window is at least 4 mm.

8. A liquid lens device, comprising:
first and second immiscible fluids defining an interface moveable by electrowetting;
a cap portion;
a base portion;
a gasket positioned between the cap portion and the base portion;
an upper window positioned within the cap portion, the upper window in the form of a plate; and
a lower window positioned within the base portion, the lower window in the form of a plate; the windows facing and substantially parallel to each other, wherein the lower window comprises opposing primary surfaces and an edge,
wherein the lower window is joined to the base portion with an adhesive, the adhesive positioned in contact with a portion of one or more of the primary surfaces and in contact with the edge,
wherein the fluids are sealed within the cap portion, base portion, gasket and windows, wherein the adhesive is a thermoset polymer comprising a hardener and a polymer, and
further wherein a height of the edge of the lower window is greater than 0.3 mm and less than 1.2 mm.

9. The device according to claim 8, wherein the portion of one or more of the primary surfaces, and the edge of the lower window, comprises a surface area of at least 7.0 mm$^2$ and at least 2.0 mm$^2$, respectively.

10. The device according to claim 8, wherein a diameter of the lower window is at least 4 mm.

11. The device according to claim 8, wherein the height of the edge of the lower window is greater than 0.3 mm and less than or equal to 0.6 mm.

12. The device according to claim 8, wherein the portion of the edge of the lower window comprises a height of at least 0.15 mm.

\* \* \* \* \*